a2

(12) United States Patent
McCool et al.

(10) Patent No.: US 7,467,155 B2
(45) Date of Patent: Dec. 16, 2008

(54) METHOD AND APPARATUS FOR REPRESENTATION OF UNSTRUCTURED DATA

(75) Inventors: Michael McCool, Pasadena, CA (US);
Linda Ann Wald, Los Angeles, CA (US)

(73) Assignee: Sand Technology Systems International, Inc., Westmount, Quebec ( * ) Notice: Subject to any disclaimer, the term of this patent is extended or adjusted under 35 U.S.C. 154(b) by 334 days.

(21) Appl. No.: 11/180,053

(22) Filed: Jul. 12, 2005

(65) Prior Publication Data

US 2007/0016602 A1 Jan. 18, 2007

(51) Int. Cl.
*G06F 17/30* (2006.01)

(52) U.S. Cl. .............................. 707/102; 707/2; 707/3; 707/101

(58) Field of Classification Search ................ 707/1, 707/2, 3, 4, 5, 6, 7, 8, 9, 10, 100, 102, 103
See application file for complete search history.

(56) References Cited

U.S. PATENT DOCUMENTS

| | | | | |
|---|---|---|---|---|
| 5,036,457 | A | | 7/1991 | Glaser et al. ................... 703/22 |
| 5,726,772 | A | * | 3/1998 | Parker et al. ................ 358/3.19 |
| 5,974,411 | A | | 10/1999 | McCool et al. ................. 707/3 |
| 6,035,311 | A | | 3/2000 | McCool et al. ............. 708/231 |
| 6,584,470 | B2 | * | 6/2003 | Veale .......................... 707/102 |
| 6,728,728 | B2 | * | 4/2004 | Spiegler et al. ......... 707/103 R |
| 6,785,677 | B1 | * | 8/2004 | Fritchman ...................... 707/6 |
| 6,826,566 | B2 | * | 11/2004 | Lewak et al. .................... 707/4 |
| 6,985,483 | B2 | * | 1/2006 | Mehrotra et al. ............ 370/389 |
| 7,007,030 | B2 | * | 2/2006 | Zibin et al. .................. 707/100 |
| 7,010,686 | B2 | * | 3/2006 | Thoone et al. .............. 713/165 |
| 7,035,843 | B1 | * | 4/2006 | Bellamkonda et al. ......... 707/3 |
| 7,096,230 | B2 | * | 8/2006 | Kraft .......................... 707/102 |
| 7,096,235 | B2 | * | 8/2006 | McCool et al. ............. 707/201 |
| 7,133,862 | B2 | * | 11/2006 | Hubert et al. ................... 707/3 |
| 7,146,361 | B2 | * | 12/2006 | Broder et al. ................... 707/5 |
| 7,181,438 | B1 | * | 2/2007 | Szabo .......................... 707/2 |
| 7,188,168 | B1 | * | 3/2007 | Liao .......................... 709/224 |

(Continued)

FOREIGN PATENT DOCUMENTS

CA         1338601         9/1996

OTHER PUBLICATIONS

HDS, Hitachi Data Systems, *Nucleus*, 11 pgs.

*Primary Examiner*—Pierre M. Vital
*Assistant Examiner*—Mohammad S Rostami
(74) *Attorney, Agent, or Firm*—Christie, Parker & Hale, LLP

(57) ABSTRACT

Method and apparatus providing a binary representation of a document storing unstructured data. A unique word identifier is obtained for each word included in the document. A word select vector includes positions identified by different word identifiers. A 1-bit value is stored at positions identified by the word identifiers of the words included in the document. A unique position identifier is further assigned to each word appearing in the document. A word use set includes vectors for each unique word identifier for which a 1-bit is stored in the word select vector. Each vector in the word use set indicates the position identifiers of the instances of a particular word included in the document. Once the binary representation is generated, it may be efficiently searched to determine whether particular words appear in the document.

22 Claims, 20 Drawing Sheets

U.S. PATENT DOCUMENTS

| | | | |
|---|---|---|---|
| 7,194,450 B2 * | 3/2007 | Roux et al. | 707/2 |
| 7,236,972 B2 * | 6/2007 | Lewak et al. | 707/4 |
| 7,251,694 B2 * | 7/2007 | Gupta et al. | 709/226 |
| 7,254,559 B2 * | 8/2007 | Florance et al. | 705/51 |
| 2002/0087567 A1 * | 7/2002 | Spiegler et al. | 707/100 |
| 2003/0195873 A1 * | 10/2003 | Lewak et al. | 707/3 |
| 2003/0208488 A1 * | 11/2003 | Perrizo | 707/6 |
| 2004/0044659 A1 * | 3/2004 | Judd et al. | 707/3 |
| 2004/0243554 A1 * | 12/2004 | Broder et al. | 707/3 |
| 2005/0132342 A1 * | 6/2005 | Van Lunteren | 717/143 |
| 2006/0020571 A1 * | 1/2006 | Patterson | 707/1 |
| 2006/0287993 A1 * | 12/2006 | Yao et al. | 707/4 |
| 2007/0112714 A1 * | 5/2007 | Fairweather | 706/46 |

* cited by examiner

PID: | THIS IS AN EXAMPLE OF A TEST EXAMPLE
     |  1    2  3    4       5   6 7    8

FIG. 3

WID 1:    A
WID 2:    AN
WID 50:   IS
WID 110:  OF
WID 300:  TEST
WID 302:  THIS
WID 4001: EXAMPLE

FIG. 4

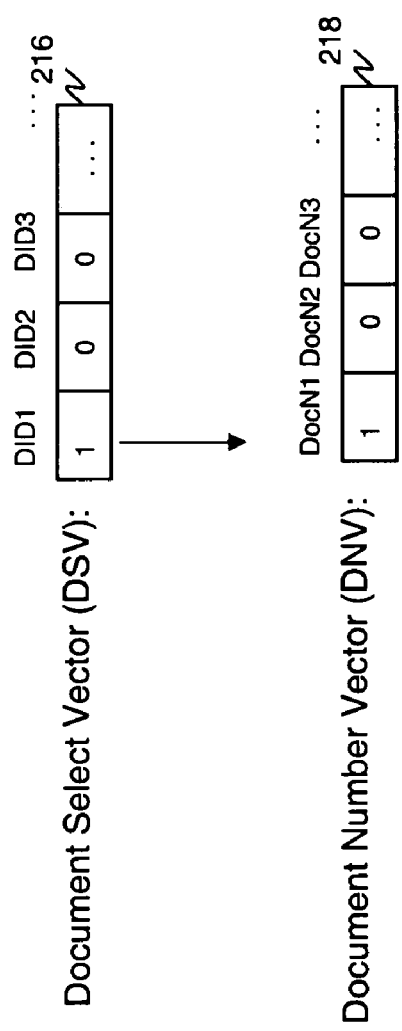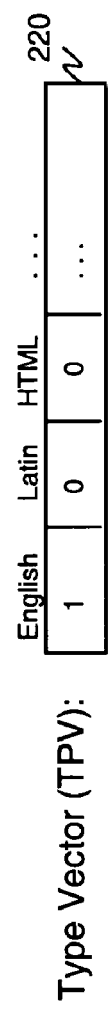
FIG. 8
FIG. 9

PID: | THIS IS AN INSERT EXAMPLE
| 9  10 11 12  13

FIG. 11

WID 1:     A
WID 2:     AN
WID 50:    IS
WID 110:   OF
WID 300:   TEST
WID 302:   THIS
WID 4001:  EXAMPLE
WID 5212:  INSERT

FIG. 12

METHOD AND APPARATUS FOR REPRESENTATION OF UNSTRUCTURED DATA

FIELD OF THE INVENTION

This invention relates generally to information retrieval, and more specifically, to a system and method for representing and efficiently retrieving unstructured data.

BACKGROUND OF THE INVENTION

Canadian Patent No. 1,338,601, which is fully incorporated herein by reference, is directed to a system and method for representing relational databases using binary representations. Data in a relational database may be described as structured data since the data may be organized into structured columns, rows, and the like.

Unstructured data, on the other hand, is data that is stored as a document, and not contained in the tables of a database. The document may be a memo, book, e-mail message, design specification, or the like.

Current mechanisms for representing and searching for unstructured data are inefficient and costly. One mechanism uses suffix tries. A suffix trie is a trie that represents a given string by including it and all its suffixes. For example, the string "This is a cat" would be represented in the trie by the strings "This is a cat," "is a cat," "a cat," and "cat." However, a document must be indexed as a single string, or duplicate strings might occur. Each string in the trie must necessarily be distinct. However, this may take up a lot of space. Although mechanisms exist for compressing the information, the strings must nonetheless be represented, and compressing the trie has a cost of increased search time. Accordingly, there is a need for representing and searching for unstructured data in an efficient and cost-effective manner.

SUMMARY OF THE INVENTION

According to one embodiment, the present invention is directed to a system for representing and searching a document including unstructured data. The system includes a data store storing the document, and a processor executing program instructions. The program instructions include generating a binary representation of the unstructured data in the document and searching the binary representation in response to a search request. The processor generates an output based on the search. The system further includes a memory storing the binary representation of the unstructured data in a plurality of data structures.

According to another embodiment, the present invention is directed to a computer-implemented method for representing and searching a document including unstructured data. The method includes generating, under control of the computer, a binary representation of the unstructured data in the document; storing the binary representation of the unstructured data in a plurality of data structures; receiving a search request; searching, under control of the computer, the binary representation in response to the search request; and generating, under control of the computer, an output based on the search.

According to a further embodiment, the present invention is directed to a method for representing unstructured data included in a document. The method includes parsing the document; obtaining a unique identifier for each unstructured data included in the document; storing a first bit-value at each position of a first binary bit vector identified by each obtained unique identifier; assigning a unique position identifier for each unstructured data included in the document; retrieving a second binary bit vector for each unique identifier for which the first bit-value is set in the first binary bit vector; and storing a second bit-value at a position of a particular second binary bit vector identified by the position identifier assigned to the unstructured data associated with a particular unique identifier associated with the particular second binary bit vector.

According to one embodiment, the data structures include a first binary bit vector identifying each unstructured data included in the document, and a plurality of second binary bit vectors. For each unstructured data identified in the first binary bit vector, a corresponding second binary bit vector provides one or more position identifiers for the associated unstructured data.

According to one embodiment, the unstructured data is a word.

According to one embodiment, a dictionary of words provides a unique word identifier for each word in the dictionary, and each position of the first binary bit vector is associated with a particular word identifier provided by the dictionary.

According to one embodiment, the search request includes a search word, and the processor retrieves a word identifier for the search word.

According to one embodiment, a determination is made as to whether a first bit value has been set at a position in the first binary bit vector identified by the word identifier for the search word; a corresponding second binary bit vector is retrieved from the plurality of binary bit vectors based on the determination; and one or more document positions are retrieved based on one or more position identifier provided by the retrieved second binary bit vector.

According to one embodiment, a range of position identifiers associated with the document is obtained; 1-bit values are stored in a temporary vector for the range of position identifiers; and a logical AND operation is performed based on the temporary vector and the retrieved second binary bit vector.

According to one embodiment, the search request is for a phrase that includes a plurality of search words.

According to one embodiment, the data structures further include a third binary bit vector indicating a first position identifier of unstructured data at the beginning of the document, and a second position identifier of unstructured data at the beginning of the next document.

According to one embodiment, the data structures further include a fourth binary vector indicating a document position of each unstructured data in the document.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 3 illustrates unstructured text contained in an exemplary document;

FIG. 4 is a conceptual diagram of an exemplary dictionary according to one embodiment of the invention;

FIG. 8 is a conceptual diagram of a document select vector and document number vector according to one embodiment of the invention;

FIG. 9 is a conceptual diagram of a type vector according to one embodiment of the invention;

FIGS. 11-16 illustrate how various vectors in a text object are updated upon the insertion of a second document having a document ID of "2";

DETAILED DESCRIPTION

Figure 1:
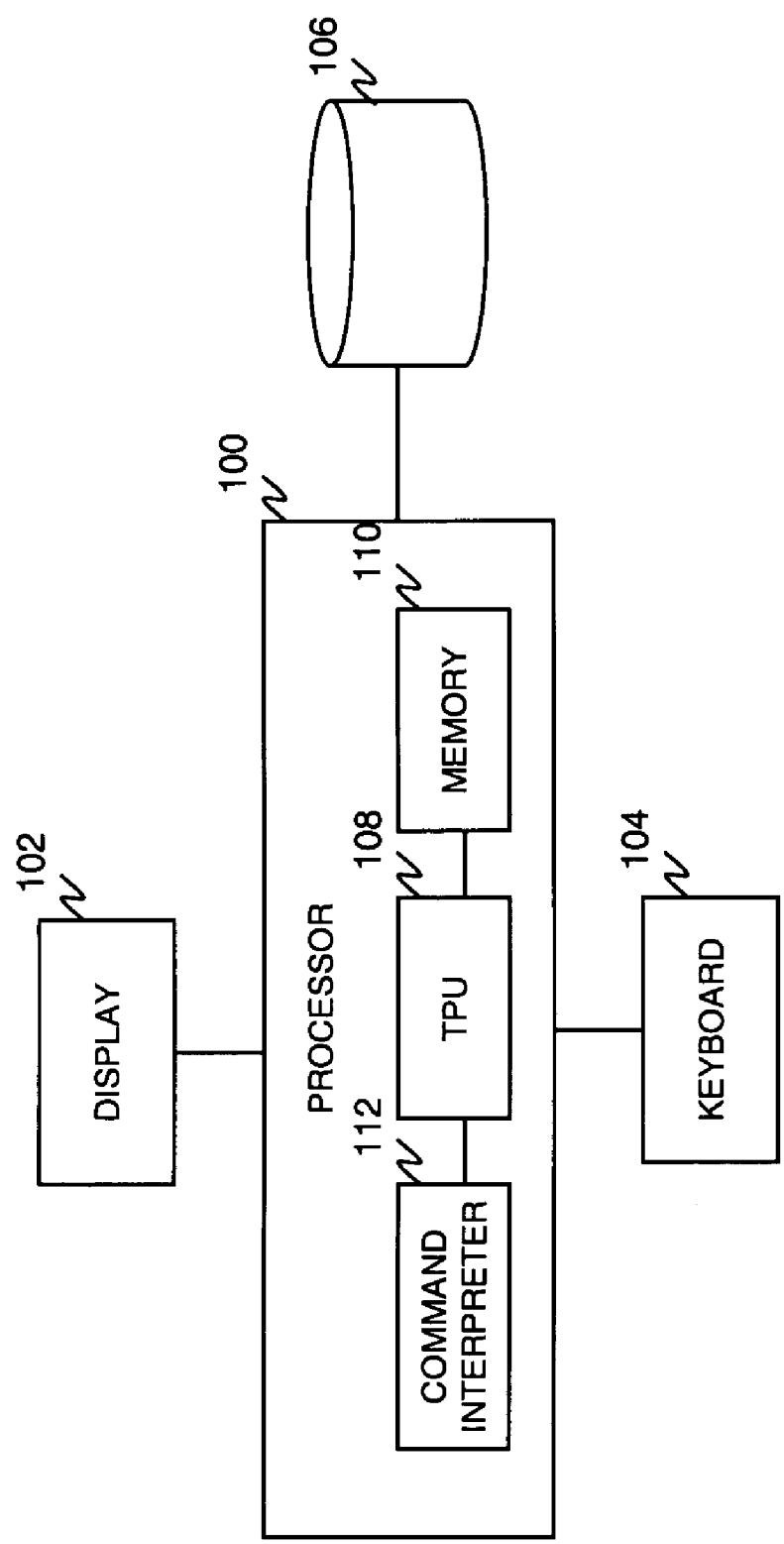
FIG. 1 is a schematic block diagram of a computer system for representing and searching for unstructured data stored in one or more documents according to one embodiment of the invention.

FIG. 1 is a schematic block diagram of a computer system for representing and searching for unstructured data stored in one or more documents according to one embodiment of the invention. The documents include, but are not limited to, memos, books, e-mail messages, design specifications, and the like, and may be generated, for example, via one or more word processing programs.

The computer system according to the illustrated embodiment includes a processor 100 coupled to an output device such as a display 102, an input device such as a keyboard 104, and an external storage device 106. The external storage device 106 may take the form of a hard disk or drive array configured to store the documents and information associated with the documents.

The processor 100 includes hardware and/or software for generating a binary representation of data contained in one or more documents stored in the external storage device 106. The processor 100 further includes hardware and/or software for efficiently searching one or more keywords contained in the documents.

According to one embodiment of the invention, the processor includes a text processing unit (TPU) 108 coupled to a local memory 110 and an optional command interpreter 112. The TPU 108 may be, for example, a microprocessor which retrieves and executes computer program instructions stored in the local memory 110. Such instructions may include, for example, instructions for generating, modifying, and searching binary representations of the unstructured data contained in one or more documents. Various structures may be maintained in the local memory 110 to allow such binary representation.

The optional command interpreter 112 receives and interprets user instructions for generating, editing, and searching the structures. Such user instructions may be provided, for example, via a graphics user interface which allows the instructions to be provided in a user-friendly manner. According to one embodiment of the invention, the command interpreter 112 may be hosted within the processor or in a separate computer.

Figure 2:
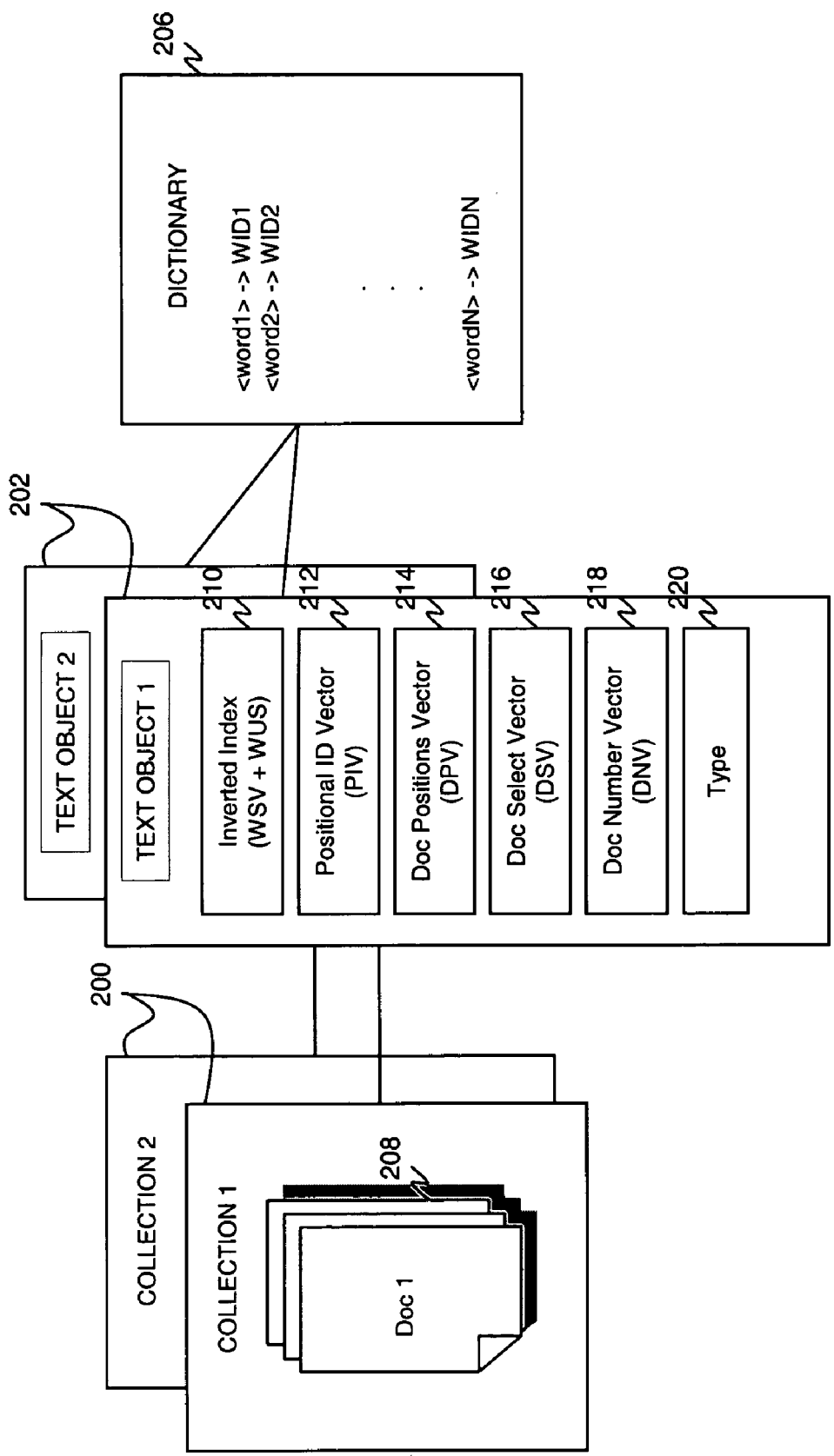
FIG. 2 is a schematic block diagram of various structures generated by a text processing unit (TPU) and stored in a local memory for efficient representation of unstructured text data according to one embodiment of the invention.

FIG. 2 is a schematic block diagram of various structures generated by the TPU 108 and stored in the local memory 110 for allowing the binary representation of unstructured text data according to one embodiment of the invention. These structures include one or more collections 200, one or more text objects 202, and one or more dictionaries 206. A collection 200 includes a group of documents 208 that share a common denominator. For example, one collection may consist of documents forming different chapters of a particular book. Another collection may consist of documents having a particular characteristic, such as, for example, e-mail documents.

According to one embodiment of the invention, the documents in a collection are represented via a single text object 202. Such documents are also described as being in the text object.

According to the illustrated embodiment, the text object 202 includes the structures that allow a binary representation of the documents in the text object. Such structures include an inverted index 210, a positional ID vector (PIV) 212, document positions vector (DPV) 214, document select vector (DSV) 216, document number vector (DNV) 218, and a type vector 220.

The inverted index 210 includes a word select vector (WSV) and a word use set (WUS). The WSV identifies each word appearing in the documents in the text object. The WUS indicates the positions of the instances of the words identified in the WSV.

The PIV 212 indicates the start position of a first indexed word in each document in the text object 202 as well as the start position of a word in a next document in the text object.

The DPV 214 indicates, for each document in the text object, the position in the original document (document positions, dposns) in which an instance of a word occurs. Knowing the position in the original document in which an instance of a word occurs is helpful to actually locate the word in the original document and display the results of a search query for the word. For example, the positions in the original document where instances of the word occurs may be highlighted based on the document position information.

The DSV 216 stores for each document in the text object 202, a document identifier (DID) associated with the document. The DNV 218 stores for each document in the text object, a document number associated with the document. The document number reflects an order in which the document appears in the collection. For example, if a document is the fifth document inserted in the collection, it is assigned a document number of "5." The document number changes if a document with a lower document number is deleted. The document ID, on the other hand, uniquely identifies the document and does not change.

The type vector 220 indicates the type of text used by the documents in the text object 202. For example, the type may be English, Latin, Hypertext Markup Language (HTML), or the like. The type for the text object is set when the text object 202 is created, and determines how the text is parsed when inserting documents, as well as how a search string is parsed for conducting searches.

According to one embodiment, each word used in a document in the text object 202 is identified by a word identifier (WID) obtained from the dictionary 206. A dictionary lookup for a particular word returns a WID for the particular word.

FIG. 3 illustrates unstructured text contained in an exemplary document. For purposes of this illustration, it is assumed that this is the only document in the text object, and has a document ID and a document number of "1." According to the various embodiments of the present invention, each word in the document is associated with a positional identifier (PID). The PID indicates the position of the word in a document in the text object 202. According to one embodiment, the PIDs are sequentially assigned according to the textual order of each document, and further assigned in the order of insertion of the documents into a collection in the text object. For example, the word "this" is the first word in the first document in the text object. Accordingly, the word is assigned a PID of "1." The word "example" is the eighth word in the first document, and is thus assigned a PID of "8." If a second document is inserted into the text object, the first word in this next document will be assigned a PID of "9."

FIG. 4 is a conceptual diagram of an exemplary dictionary 206 according to one embodiment of the invention. In the illustrated embodiment, the dictionary stores a WID for each word in the exemplary text of FIG. 3.

Figure 5:
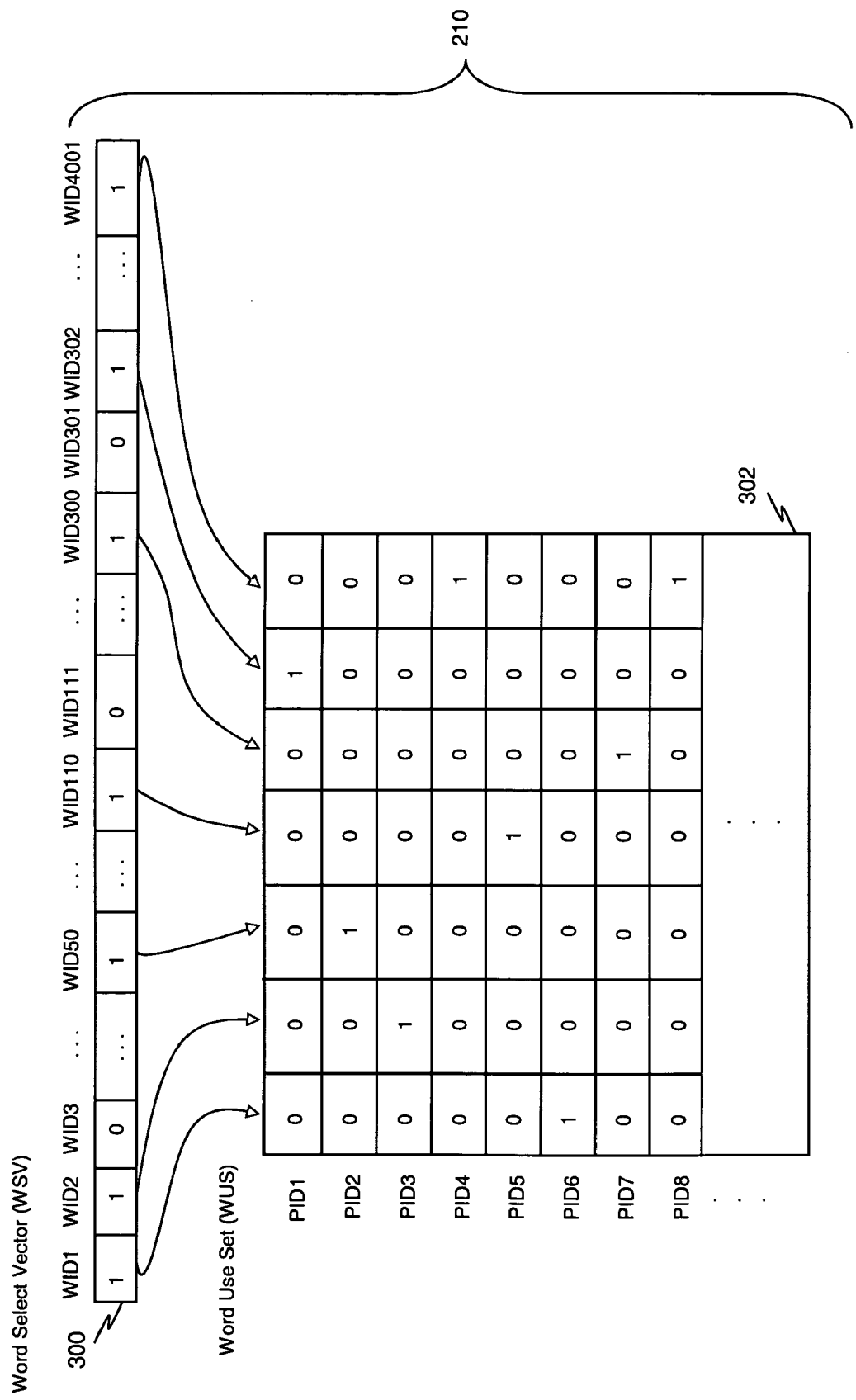
FIG. 5 is a conceptual diagram of an inverted index according to one embodiment of the invention.

FIG. 5 is a conceptual diagram of the inverted index 210 including a WSV 300 and a WUS 302 according to one embodiment of the invention. The WSV 300 is a binary BIT vector with a 1-bit set for each word appearing in the documents in the text object. Thus, for the exemplary document and dictionary of FIGS. 3 and 4, the WSV has a 1-bit set for WIDs "1," "2," "50," "110," "300," "302," and "4001" to respectively indicate the occurrence of the words "a," "an," "is," "of," "test," "this," and "example," in the phrase "this is an example of a test example" in the exemplary document of FIG. 3.

The WUS 302 includes a plurality of binary BIT vectors, one for every WID for which a 1-bit is set in the WSV. The position of each 1-bit in the binary BIT vector corresponds to a PID position, and is set with a 1-bit if the word corresponding to the WID appears at that PID position. Thus, for the exemplary document of FIG. 3, the binary-bit vector for WID "1" has a 1-bit set at the vector position corresponding to PID "6" to indicate that the word "a" occurs in the 6th position in the text object. Similarly, the bit vector of WID "4001" has 1-bits set at the vector positions corresponding to PIDs "4" and "8" to indicate that the word "example" occurs in the fourth and the eighth positions in the text object.

Figures 6, 7:
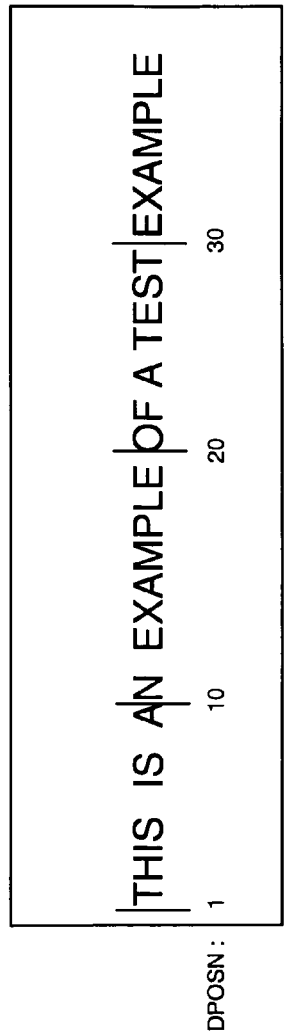
FIG. 6 is a conceptual diagram of a positional ID vector according to one embodiment of the invention.
FIG. 7 is a conceptual diagram of a document positions vector according to one embodiment of the invention.

FIG. 6 is a conceptual diagram of the PIV 212 according to one embodiment of the invention. The PIV 212 may be implemented as a binary BIT vector having a 1-bit set for each PID that corresponds to the first PID of each document in the text object, as well as the first PID of a next document to be inserted into the text object. For the exemplary document in FIG. 3, the first PID is "1." Accordingly, the BIT vector has a 1-bit set at the vector position corresponding to PID "1." The first PID of a next document to be inserted into the text object would be "9." Accordingly, the bit vector also has a 1-bit set at the vector position corresponding to PID "9."

FIG. 7 is a conceptual diagram of the DPV 214 according to one embodiment of the invention. The DPV 214 includes a plurality of binary BIT vectors, one for every document in the text object. Each BIT vector has a 1-bit set at each document position in which an instance of a word occurs in the original document. According to one embodiment, the document position indicates a character position in the document. Thus, for the exemplary document of FIGS. 3 and 7, the BIT vector for this document, identified as DocID1, has a 1-bit set at the first document position DPOSN1 where the first word "this" begins in the document. The second word "is" starts at the sixth character position. Accordingly, a 1-bit is set at DPOSN6. This continues for all the words in each document in the text object.

FIG. 8 is a conceptual diagram of the DSV 216 and DNV 218 according to one embodiment of the invention. The DSV 216 is a binary BIT vector having a 1-bit set at each vector position corresponding to the document ID of a document in the text object. The DNV 218 is indexed in the order of the 1-bits in the DSV 216 and stores a document number at a position indicating the document's order of insertion in the text object. The document in the example of FIG. 3 has a document ID of "1" (DID3), and, as the first document inserted into the text object, also has a document number of "1" (DocN1) at the first position of the DNV.

FIG. 9 is a conceptual diagram of the TPV 220 according to one embodiment of the invention. The TPV may be implemented as a binary BIT vector where a 1-bit is set at a vector position that corresponds to the type of text used by the documents in the text object. Thus, the BIT vector for the text object associated with the exemplary document of FIG. 3 has a 1-bit set at the vector location corresponding to the English text.

Figure 10A:
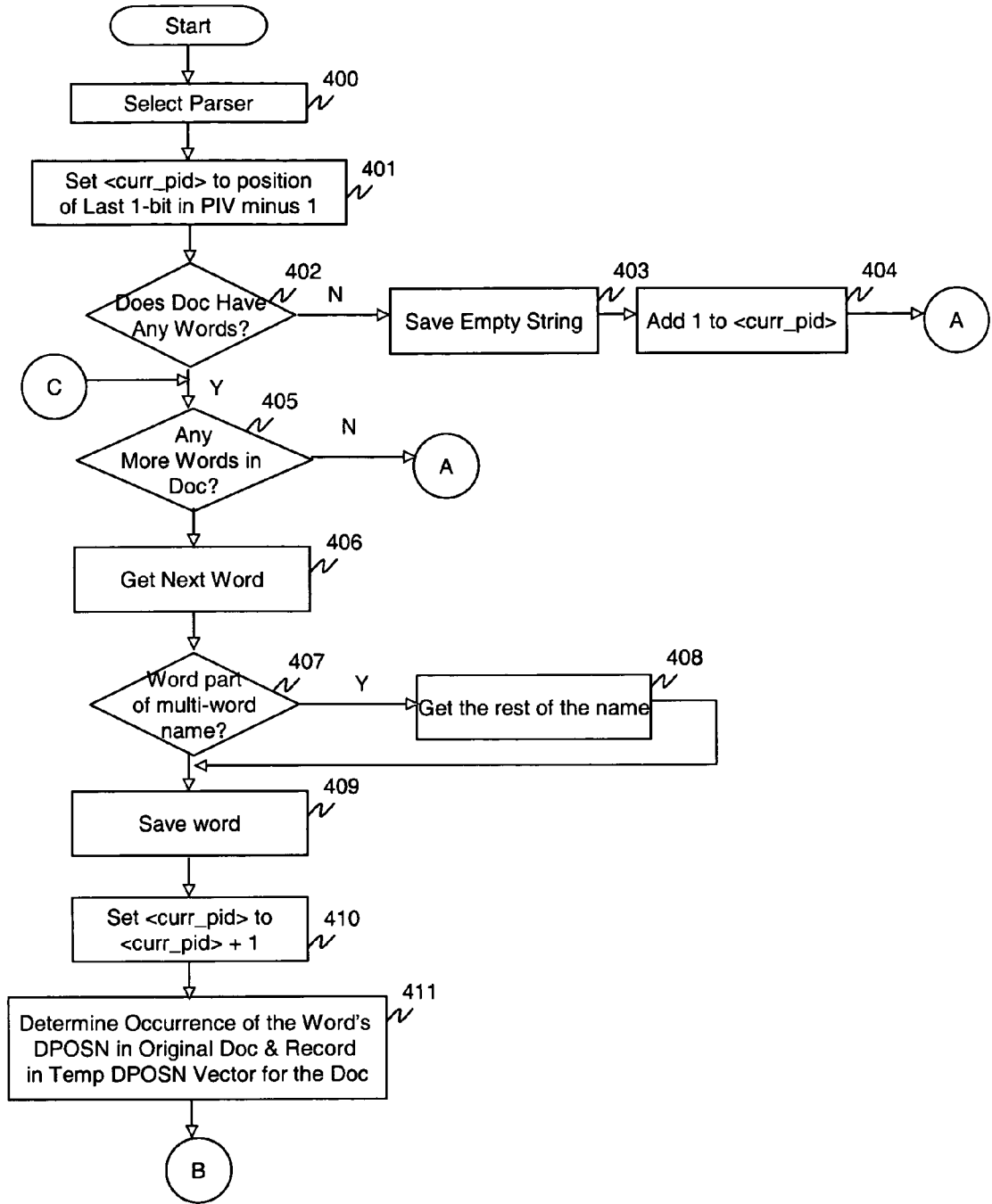
FIGS. 10A-10C are flow diagrams of an exemplary process executed by a TPU for inserting a document into a text object according to one embodiment of the invention.
Figure 10B:
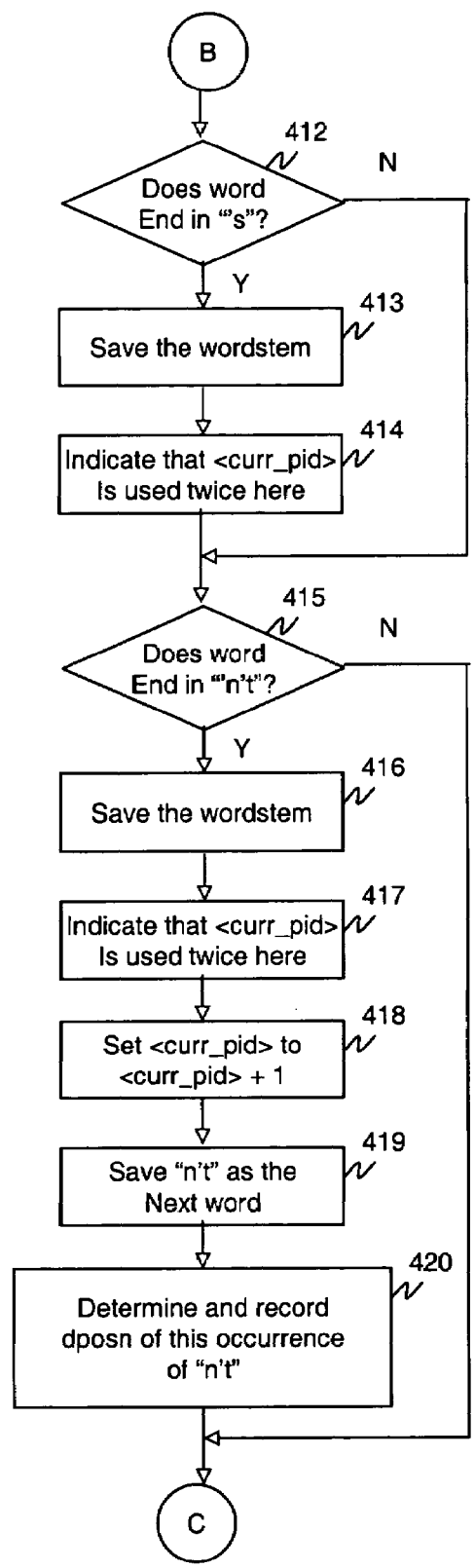
Figure 10C:
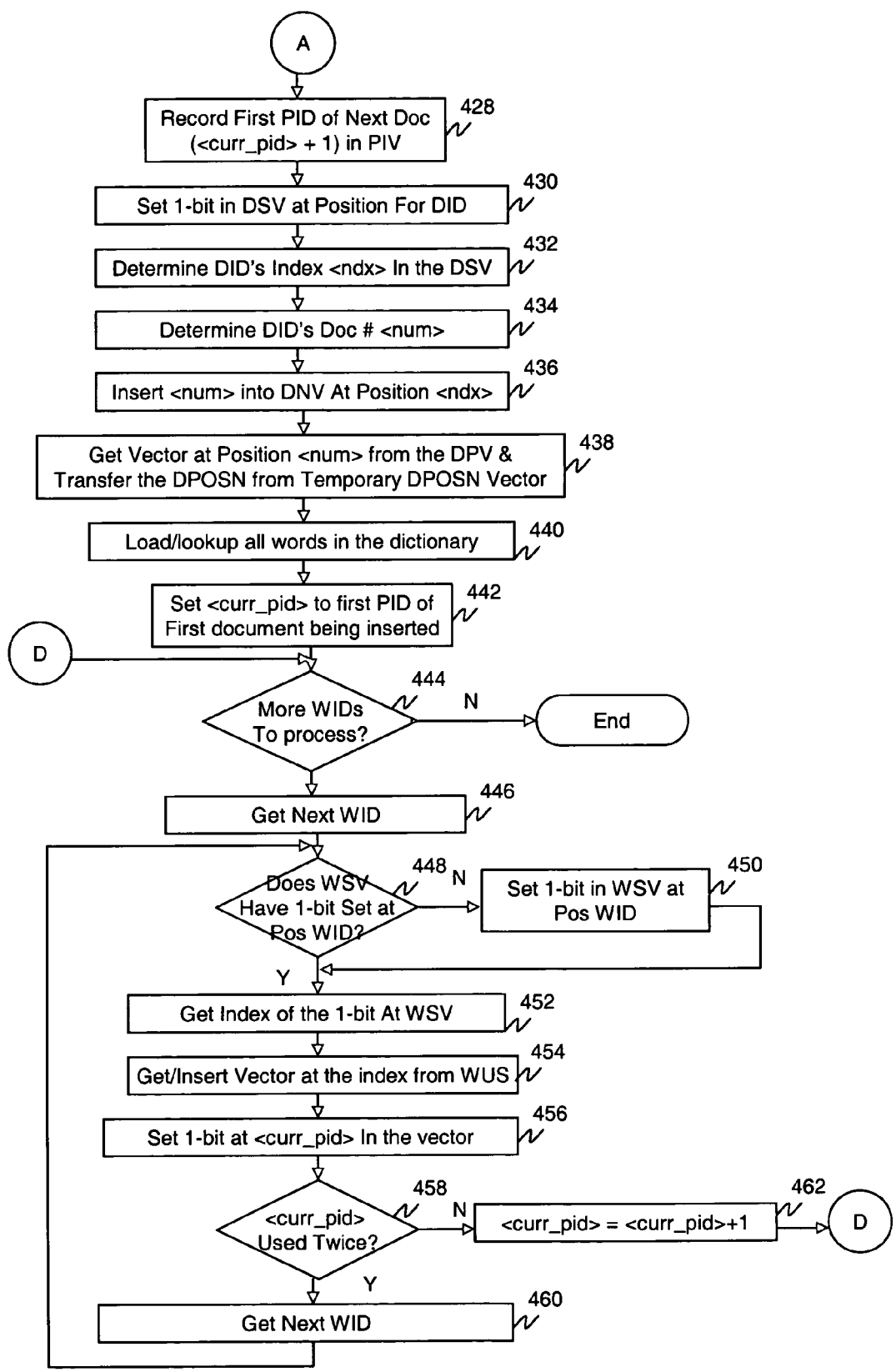

FIGS. 10A-10C are flow diagrams of an exemplary process executed by the TPU 108 for inserting a document into the text object 202 according to one embodiment of the invention. A user may transmit commands for inserting the new document using a graphics user interface provided by the command interpreter 112. According to one embodiment of the invention, the user transmits an insert command along with an insert document. The user may further identify the text object into which the document is to be inserted.

In inserting the document into the text object 202, the TPU, in steps 400-460, parses the document and generates an inverted index such as inverted index 210. In steps 428-438 the TPU updates the PIV 212, DPV 214, DSV 216, and DNV 218 to reflect the added document.

In this regard, the process, in step 400, selects an appropriate parser to be used for parsing the document. The appropriate parser is determined upon a query of the TPV 220 associated with the text object indicating the type of text used by the documents in the text object.

In step 401, the current PID <curr_pid> is set to the position of the last 1-bit in the PIV 212, minus 1. The position of the last 1-bit in the PIV is the first PID of the next document to be inserted, and is configured to be set during an insert of a previous document. If no documents have been inserted, a 1-bit is set in the first position of the PIV when the text object is created.

In step 402 a determination is made as to whether the document has any words in it. If the answer is NO, the process saves the empty string in step 403, and in step 404, adds one to <curr_pid>.

In step 405, a determination is made as to whether any more words exist in the document to be inserted. If the answer is YES, the process, in step 406, gets the next word and checks, in step 407, if it is the first word of a multi-word name. If so, the process gets the rest of the name in step 408 and concatenates it with the original word.

In step 409, the word is saved. In step 410, the current PID <curr_pid> is increased by 1. In step 411, the occurrence of the word's position in the original document <dposn> is determined and recorded in a temporary document positions vector associated with the document.

In step 412, a determination is made as to whether the word ends in "'s." If the answer is YES, the wordstem, that is, the word without the "'s" is saved in step 413. In step 414, an indication is made that <curr_pid> is used twice in this instance (for the word and the wordstem).

In step 415, a determination is made as to whether the word ends in "n't." If the answer is YES, the wordstem is saved in step 416. In step 417, an indication is made that <curr_pid> is used twice in this instance (for the word and the wordstem). In step 418, the <curr_pid> is increased by one, and in step 419, the "n't" is saved as the next word. In step 420, the process determines and records the dposn of this occurrence of "n't."

Once all the words in the document have been saved, the PIV is updated in step 428 with the first PID of a next document to be inserted into the text object.

In step 430, the DSV 216 is updated with the document ID of the added document. In step 432, the document ID's index <ndx> in the DSV is determined. In step 434, the document number <num> associated with the document ID is also determined. In step 436, the document number <num> is inserted into the DNV 218 at the position indicated by the index <ndx>. For example, if a document with a document ID of "5" is inserted, a 1-bit is set at position "5" in the DSV 216. If that 1-bit is the third 1-bit in the DSV 216, the document number of the document identified by the ID of "5" will be inserted into the third position of the DNV 218.

In step 438, a new vector at position number <num> corresponding to the document is inserted into the DPV, and the document positions tracked in the temporary document positions vector are transferred to the identified vector.

In step 440, all the saved words are loaded and looked up in the dictionary. In step 442, the <curr_pid> is set to the first PID of the document being inserted.

In step 444, a determination is made as to whether there are more WIDs to process. If the answer is YES, in step 446, the next WID is obtained. In step 448, an inquiry made as to whether the WSV 300 has a 1-bit set for the WID that is associated with the word. If the answer is NO, a 1-bit is set in the WSV 300 at the position indicated by the WID in step 450.

In step 452, the process gets the index of the 1-bit in the WSV at the position indicated by the WID, gets or inserts a vector at the index from the WUS 302 in step 454, and in step 456, sets a 1-bit at the current PID <curr_pid> in this vector.

In step 458, a determination is made as to whether <curr_pid> as been indicated as being used twice for determining if the word ends with an "'s" or an "n't." if the answer is YES, the process gets the next WID in step 460.

If <curr_pid> has not been indicated as being used twice, the process continues, and in step 462, the <curr_pid> is increased by one. The process ends when there are no more WIDs to process.

FIGS. 11-16 illustrate how the various vectors in the text object 202 are updated upon the insertion of a second document having a document ID of "2." FIG. 11 provides an example of the unstructured text contained in the second document. Because the text object already contains eight PIDs, the first PID of the second document starts at "9." The second document includes a new word, "insert," which is not contained in the dictionary 206 of FIG. 4. Accordingly, the dictionary is updated as is illustrated in FIG. 12 to include the word "insert," and to associate this word with a unique WID of "5212.".

As the string in the second document is parsed, each instance of a word appearing in the new document is saved for lookup in the updated dictionary.

Figures 14, 15:
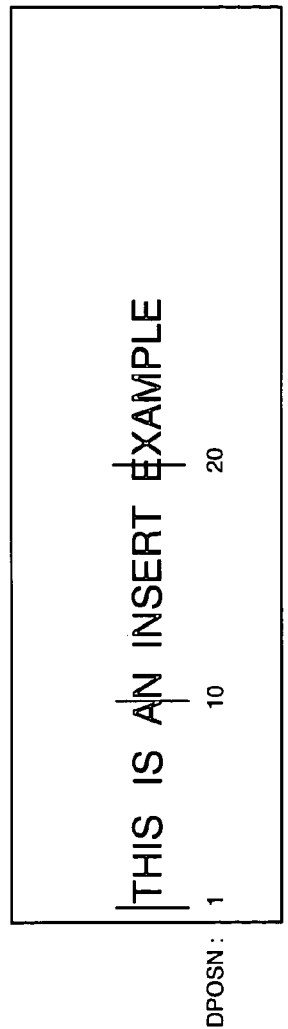

The PIV 212 of FIG. 6 is also updated to result in an updated PIV 212a as is illustrated in FIG. 14. Because the second document ends with a PID of "13," a 1-bit is set in the vector position corresponding to PID "14" in the updated PIV 212a to reflect that the first PID of a next document to be inserted into the text object will have PID "14."

Figure 16:
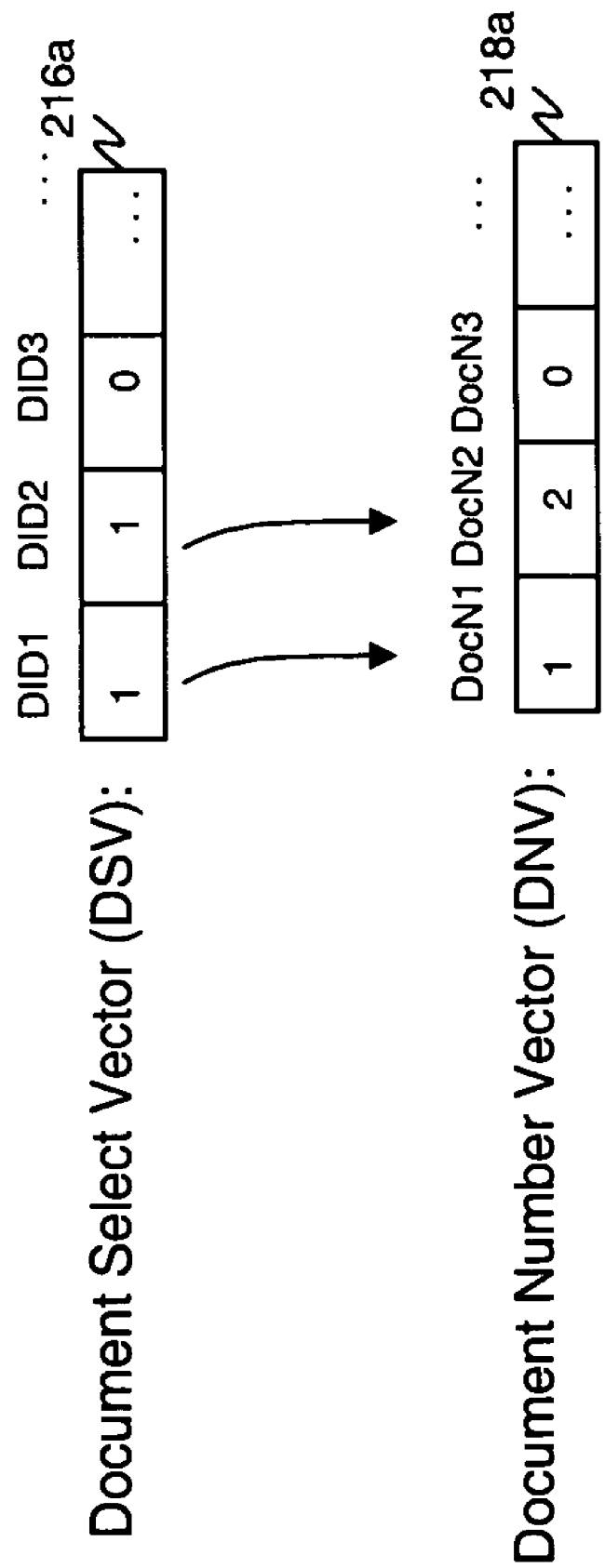

The DPV 214, DSV 216, and DNV 218 of FIGS. 7 and 8 are also updated to result in an updated DPV 214a, DSV 216a, and DNV 218a as is illustrated in FIGS. 15-16. The updated DPV 214a indicates the beginning character position (dposn) of each word in the second document. The updated DSV 216a has a 1-bit set in the second vector position to indicate that the second document has a document ID of "2." Furthermore, the updated DNV 218a includes a "2" in the second vector position to indicate that the document with document ID "2" (whose index is "2" in the WSV) is the second document that was inserted into the text object.

Figure 13:
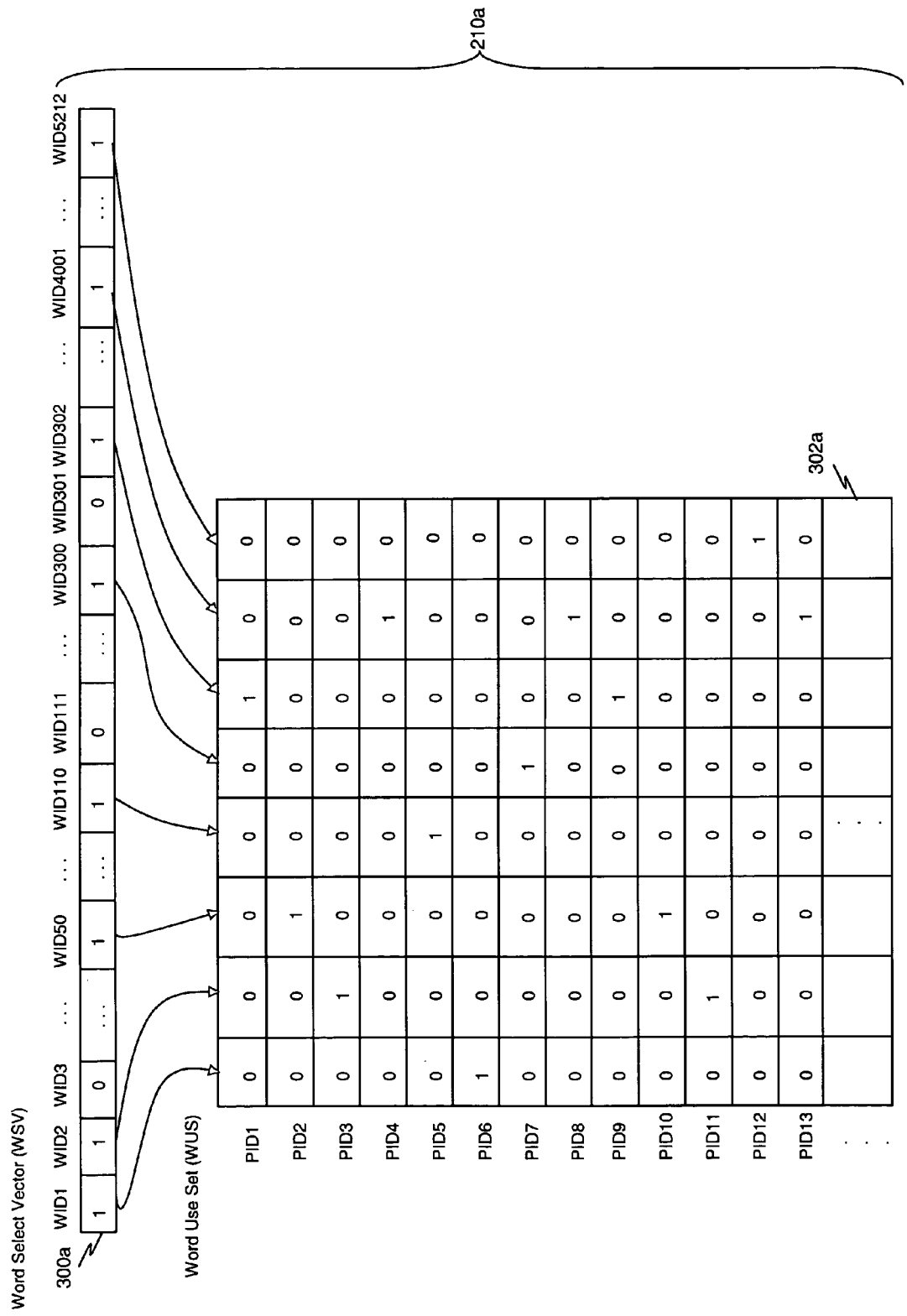

The saved words are all looked up in the updated dictionary 206a to obtain their WIDs. The inverted index 210a is then updated as is illustrated in FIG. 13. Thus, the WSV 300 of FIG. 5 is updated to include a 1-bit set at the vector position corresponding to WID "5212" assigned to the word "insert" which was not contained in the previous document, as is illustrated in updated WSV 300a of FIG. 13. The WUS 302 of FIG. 5 is also updated to include the PIDs of words in the second document, as is illustrated in updated WUS 302a of FIG. 13.

Figure 17:
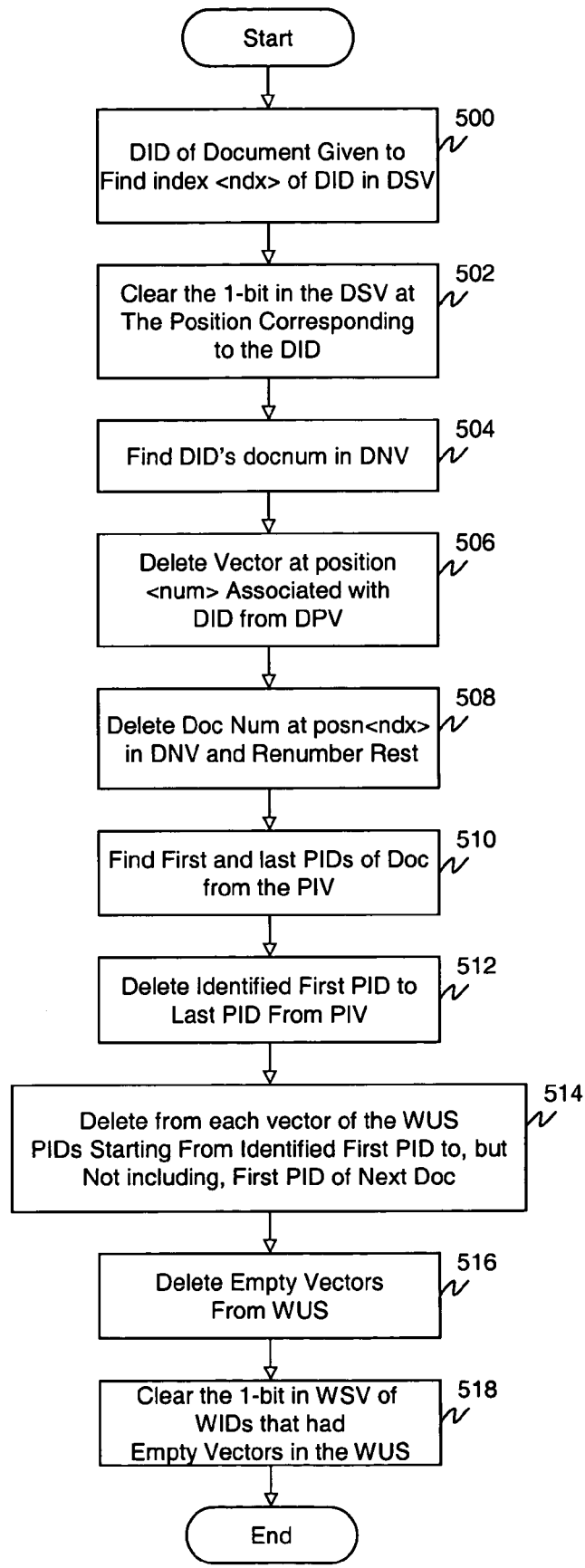
FIG. 17 is a flow diagram of an exemplary process executed by a TPU for deleting a document from a text object according to one embodiment of the invention.
Figure 18A:
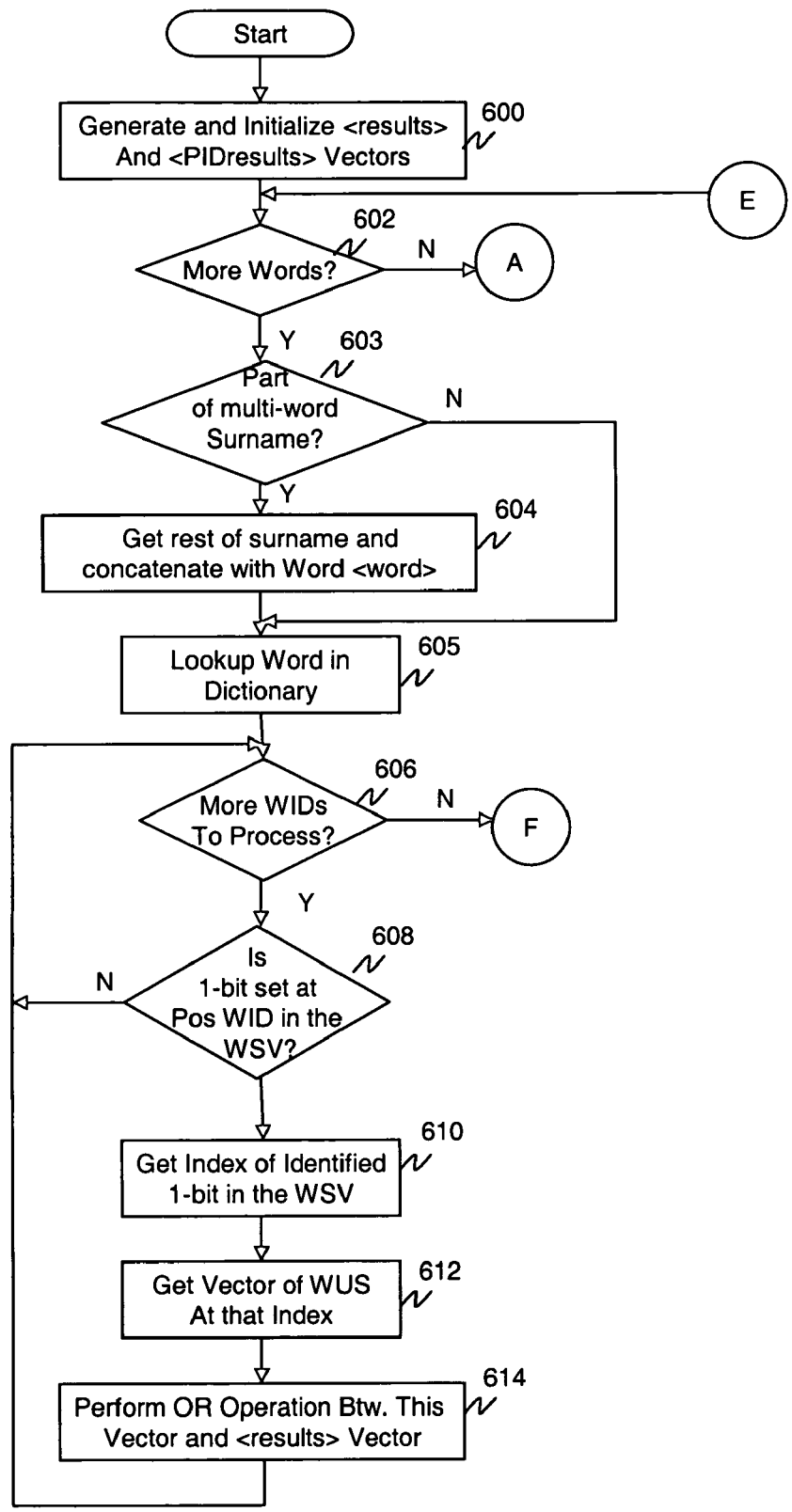
FIGS. 18A-18F are flow diagrams of an exemplary process executed by a TPU for searching a text object for a particular word or phrase according to one embodiment of the invention.
Figure 18B:
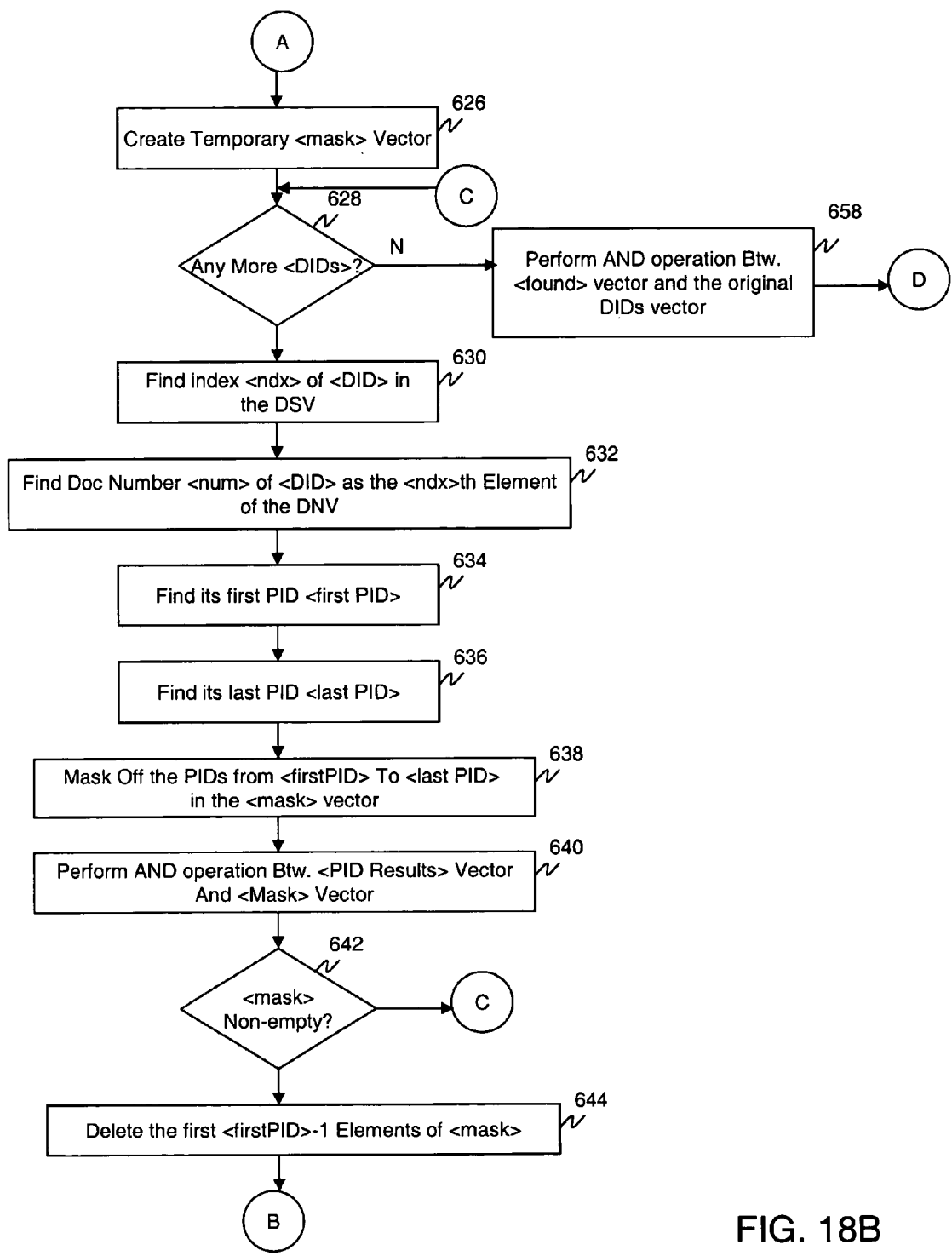
Figure 18C:
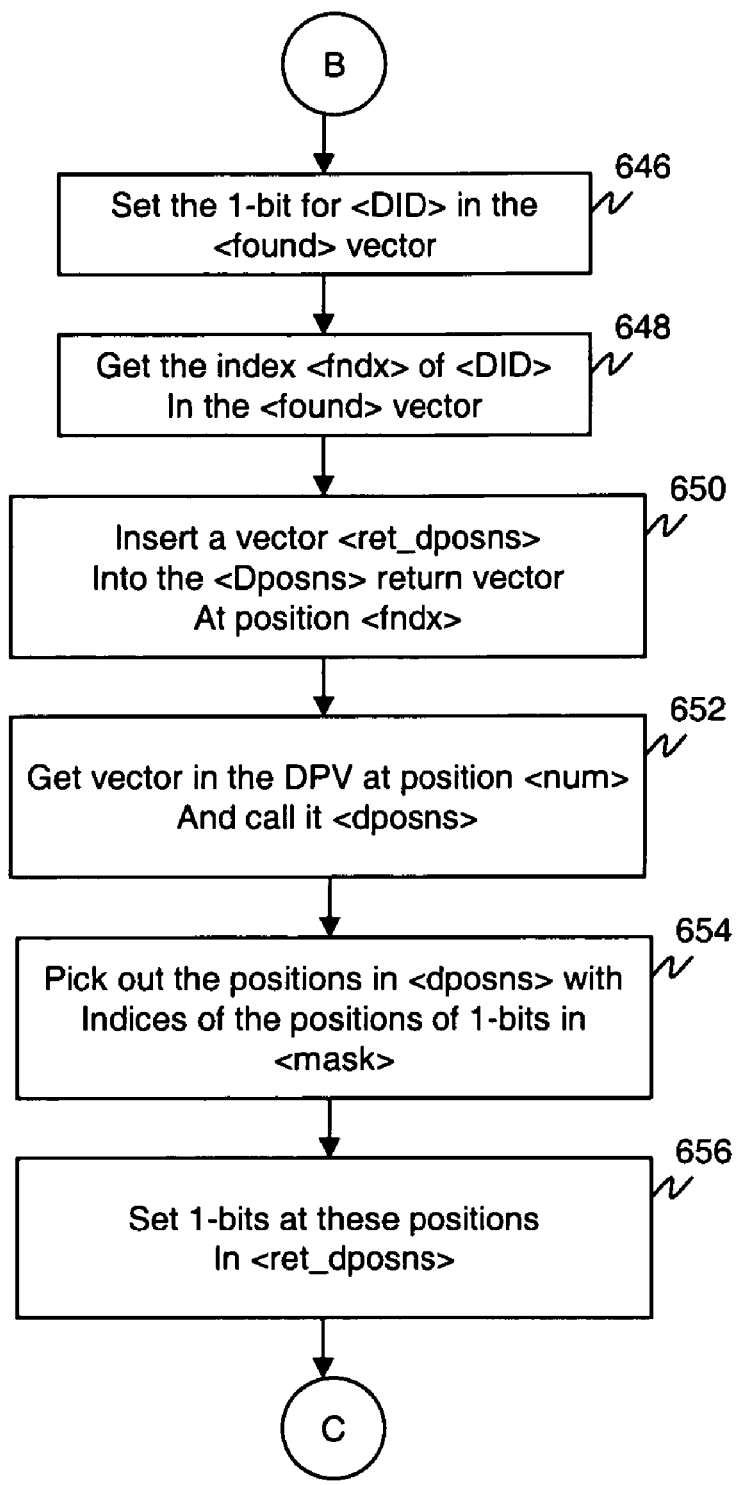
Figure 18D:
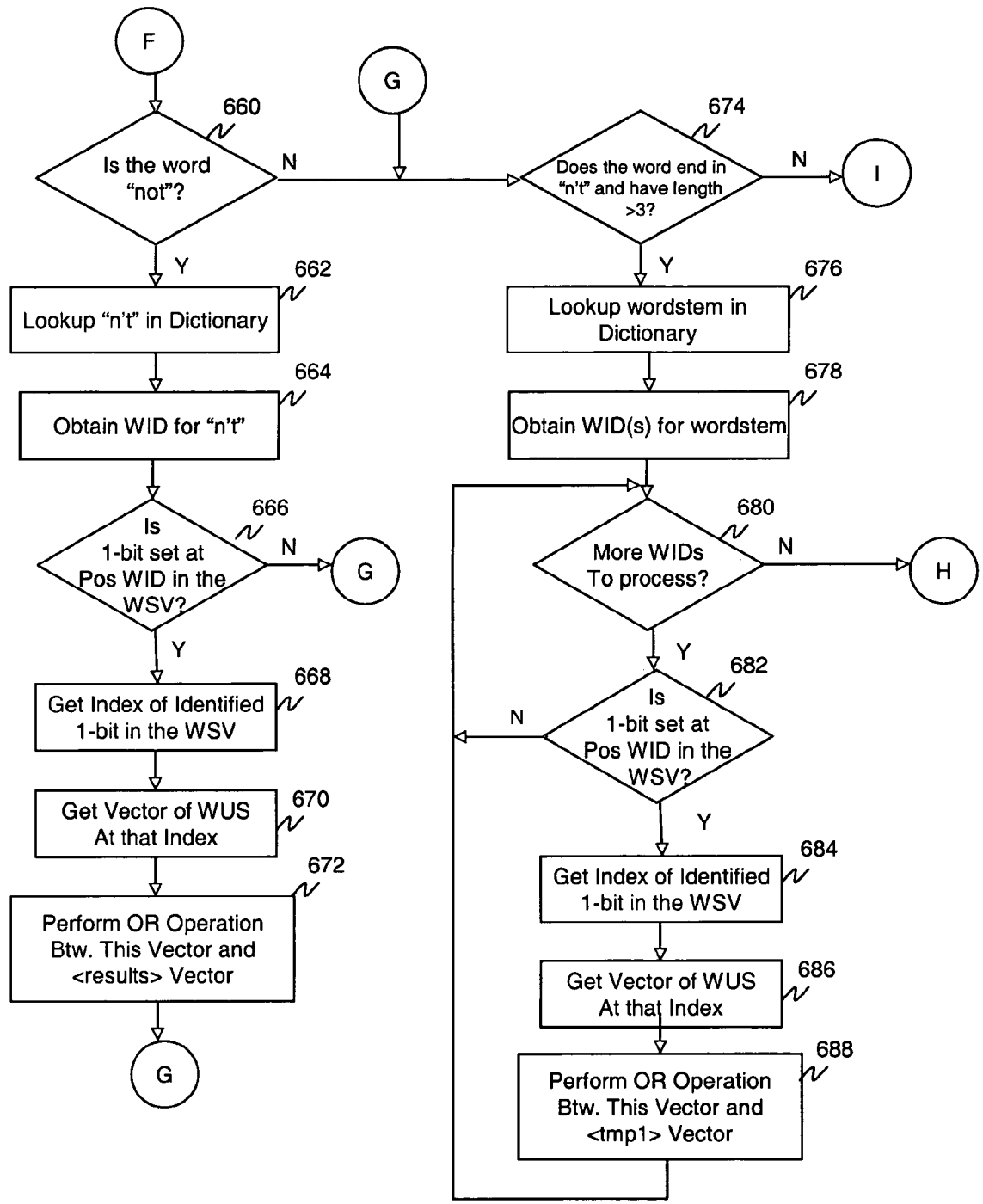
Figure 18E:
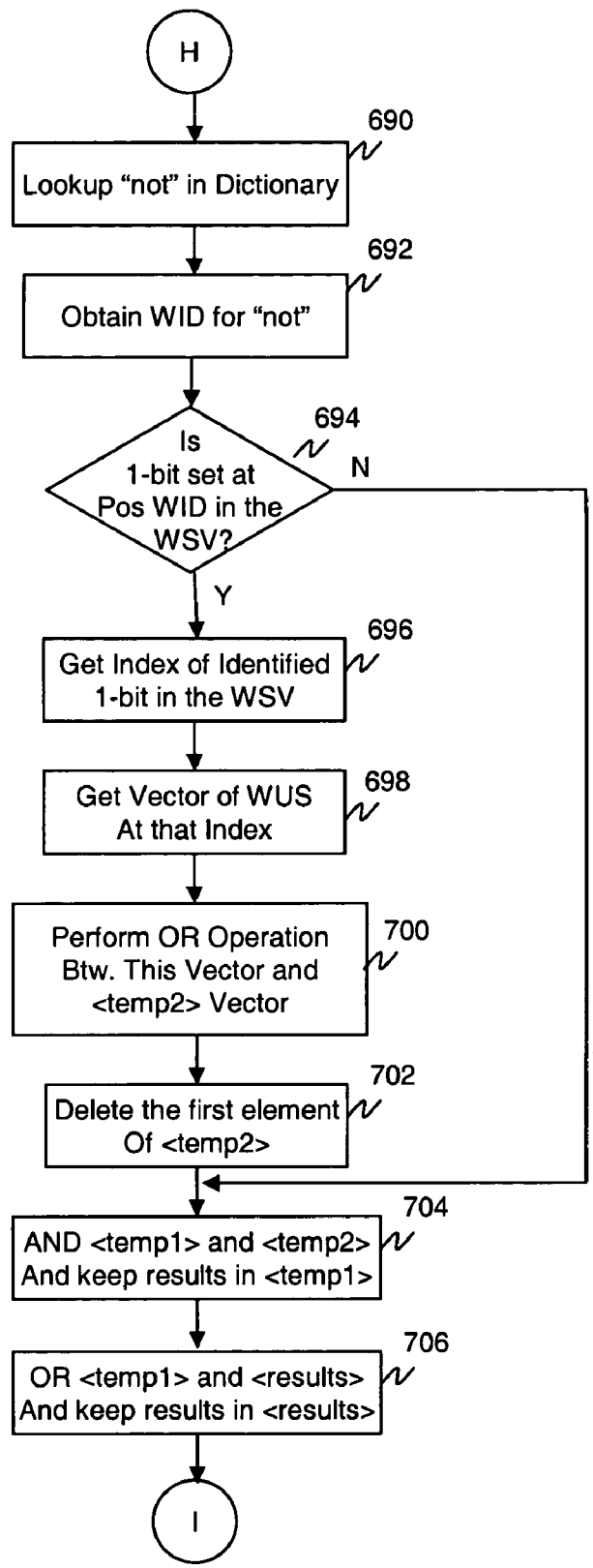
Figure 18F:
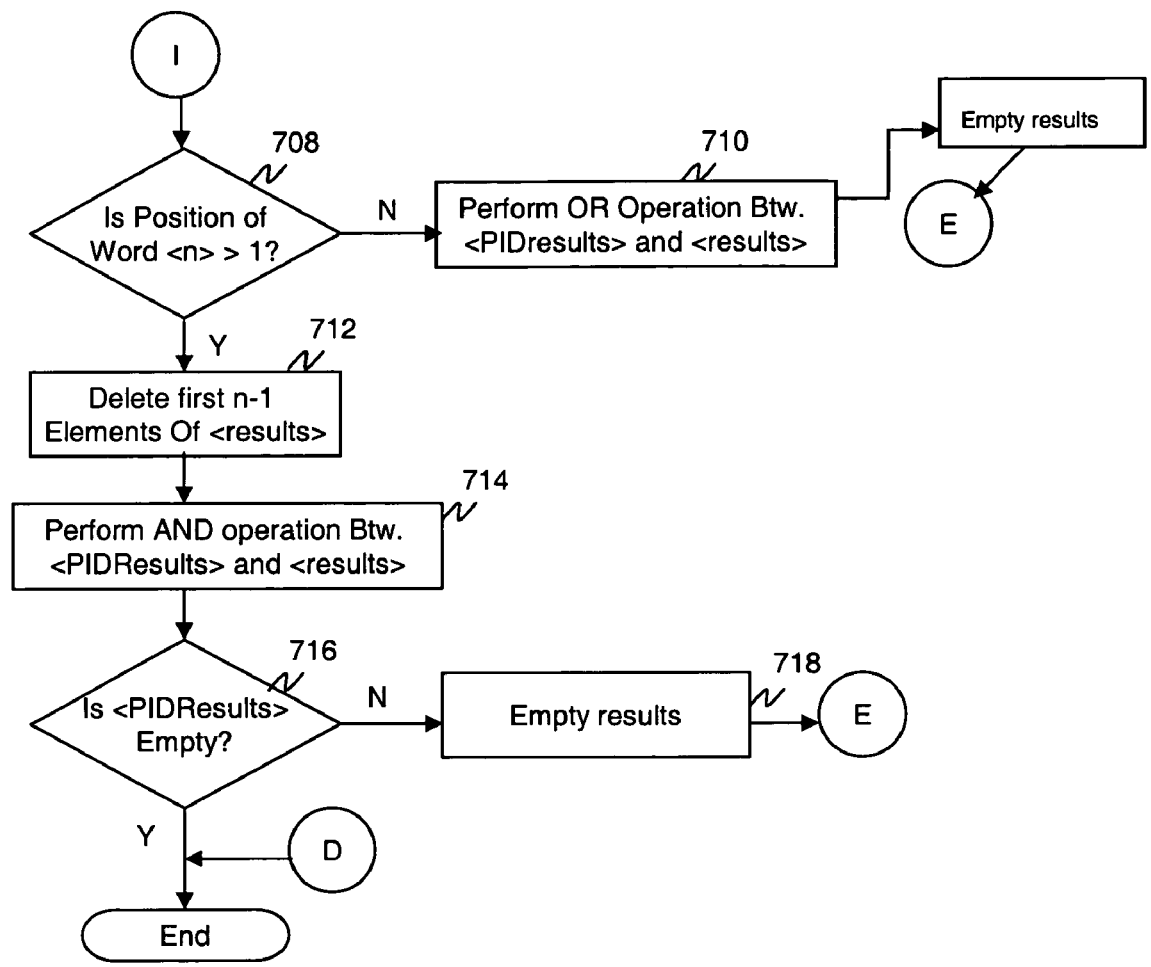

FIG. 17 is a flow diagram of an exemplary process executed by the TPU 108 for deleting a document from the text object 202 according to one embodiment of the invention. A user may transmit a command to delete a particular document using a graphics user interface provided by the command interpreter 112. The document to be deleted may be identified, for example, with a document ID (DID). The user may further identify the text object from which the document is to be deleted.

In deleting the document from the text object 202, the TPU, in step 500 is given the DID of the document to find the index <ndx> of the DID in the DSV. In step 502, the TPU clears the 1-bit in the DSV at the vector position that corresponds to the DID.

In step 504, the DID's document number <num> is located in the DNV 218. The document number <num> of the DID is at posn <ndx>.

In step 506, the TPU deletes from the DPV 214, 214a, at position <num> a vector of document positions associated with the DID.

In step 508, the document number at posn <ndx> is deleted from the DNV.

In step 510, the TPU locates from the PIV 212, 212a the first PID to the last PID of the document that is to be deleted, and deletes the first PID to the last PID from the PIV in step 512. The may be done, for example, by determining the order of the document in the text object as identified in the DNV. Thus, if the document to be deleted is the second document, a second 1-bit is searched from the PIV, and the position of the located 1-bit is determined to be the first PID of the second document. The last PID is the first PID of the next document, minus 1.

In step 514, the TPU deletes from each vector of the WUS 302, 302a all PIDs starting from the identified first PID to, but not including, the first PID of a next document 514. According to one embodiment of the invention, bits are actually removed from the vector. For example, if the vector has a 1-bit at position 4, and position 3 is deleted, the vector now has a 1-bit at position 3.

In step 516 all empty vectors are deleted from the WUS 302, 302a. Similarly, in step 518, all WIDS that had empty vectors in the WUS have their 1-bits cleared in the WSV 300, 300a.

According to one embodiment of the invention, both the insertion and deletion process may work with multiple documents at a time.

FIGS. 18A-18F are flow diagrams of an exemplary process executed by the TPU 108 for searching a text object for a particular word or phrase (sometimes simply referred to as a word), according to one embodiment of the invention. A user may transmit a command to search for the word using a graphics user interface provided by the command interpreter 112. The search request may include a text object, a vector of DIDs to search (the <DIDs> vector), the search word (including any wildcards), and a vector of document positions for returning the document positions of places where the search word is found (the return <Dposns> vector).

In step 600, a temporary  vector is generated to hold the PIDs of each word being searched. A temporary <PIDresults> vector is also generated to hold the overall PID results for all the words being searched. Both the  and <PIDresults> vectors start out empty.

In step 602, a determination is made as to whether there are any more words in the search request that need to be searched. If the answer is YES, a determination is further made as to whether the word is part of a multi-word surname. If the answer is YES, the rest of the surname is obtained and concatenated with <word> in step 603.

The TPU proceeds to find the PID vector for the current word. In this regard, in step 605, the TPU performs a lookup of the current word in the dictionary 206 for obtaining one or more WIDs for the word. Multiple WIDs may be returned for the word if it contains wildcards.

Then the TPU proceeds to obtain the PIDs for each returned WID. Accordingly, in step 606, a determination is made as to whether all the WIDs returned from the dictionary lookup have been processed. If the answer is NO, a determination is made in step 608 as to whether a 1-bit has been set at position WID in the WSV 300. If the answer is YES, the TPU obtains, in step 610, the index of the identified 1-bit in the WSV. In step 612, the TPU obtains the vector of PIDs of the WUS 302 at the identified index. In step 614, the TPU performs a binary OR operation with the identified vector of PIDs and the  vector. The result of the binary OR operation is maintained in the  vector.

After all the returned WIDs have been processed for the current word for populating the  vector with the identified PIDs, a determination is made in step 708 as to whether the position of the word, indicated by the value <n>, is greater than one. If the answer is NO, the word is the first word to be searched, and in step 710, the TPU performs a binary OR operation with the <PIDresults> vector and the  vector, and maintains the results in the <PIDresults> vector. In step 716, a determination is made as to whether the <PIDresults> vector is empty. If the answer is YES, the search ends. If the answer is NO, the  vector is emptied in step 718 before processing the next word.

If <n> is greater than one, the word is a second or higher word in a phrase that is being searched. Thus, the TPU deletes, in step 712, the first n−1 elements of the  vector. In step 714, the TPU performs an AND operation between the <PIDresults> vector and the  vector, and maintains the results in the <PIDresults> vector. For example, if the current word has the second position in the search phrase (i.e. <n>=2), steps 712 and 714 produces positions where <word2> occurs immediately after <word1> in the text object. For example, if <word1> occurs at PID 8, we want to know if <word2> occurs at PID 9. <word2>'s PID vector will have a 1-bit set in position 9. Deleting the first <n>−1 elements of <word2>'s PID vector effectively moves this 1-bit to position 8, and performing the AND operation between the two vectors gives all the PIDs where <word1> is immediately followed by <word2>. At the end, if a 1-bit <n> is set in <PIDresults>, this implies that the first word of the phrase was found at PID <n>, the second word, <word2>, at PID <n>+<p2>−1, the third word, <word3>, at PID <n>+<p3>−1, and so on, where <pn> is the position of <wordn> in the phrase. In determining the position of a word in a phrase, the ending "n't" counts as a separate position. For example, in the phrase "didn't have", "have" is in position 3 because the "n't" is in position 2.

In step 716, a determination is made as to whether the <PIDresults> vector is empty. If the answer is NO, the  vector is emptied in step 718 before processing the next word. If the answer is YES, the search ends. There is no need to proceed with the search of the remaining words since the current words in the phrase that is being searched for do not appear in the correct positions.

Once all the words have been found, the TPU proceeds to obtain the document positions of the words. In this regard, the TPU, in step 626 creates a temporary <mask> vector. In step 628, a determination is made as to whether there are any more <DIDs> to process. If the answer is YES, the TPU proceeds to find, in step 630, the index <ndx> of the current <DID> in the DSV 216.

In step 632, the TPU proceeds to find the document number <num> of the current <DID> as the <ndx> th element of the DNV 218. In step 634, the TPU finds its first PID <firstPID>, which, according to one embodiment, is the position of the <num> th 1-bit in the PIV 212. In step 636, the TPU finds its last PID <lastPID>, which, according to one embodiment, is the position of the <num+1> th 1-bit in the PIV 212, minus 1.

In step 638, the TPU masks off the PIDs from the <firstPID> to <lastPID> in a temporary <mask> vector. This clears any other 1-bits in the <mask>. Thus, <mask> contains 1-bits in every position from the first PID in the <DID> to the last PID in the <DID> inclusive, and no other 1-bits.

In step 640, the TPU performs a binary AND operation with the <PIDresults> vector, and keeps the results in the <mask> vector. This results in the <mask> vector containing all the PIDs of occurrences of the word that are in the range of PIDs that correspond to words in the document <DID>.

In step 642, a determination is made as to whether the <mask> vector is nonempty. If the answer is YES, the word/phrase was found in the <DID>. In this case, the TPU, in step 644, deletes the first <firstPID>−1 elements of <mask>. This changes the positions of the 1-bits in <mask> from indicating the PIDs in the entire text object to indicating positions in the individual document <DID>. That is, the PID <firstPID>, which indicates the first word in <DID>, is effectively moved to position 1. Each 1-bit in the <mask> vector now indicates a word in <DID>, where the position of the 1-bit indicates the index of the word in <DID>.

In step 646, the TPU sets a 1-bit in the <found> vector at position <DID>. In step 648, the TPU gets the index <fndx> of <DID> in the <found> vector. In step 650, a vector referred to as <ret_dposns> is inserted into the <Dposns> return vector at position <fndx>. In step 652 the TPU gets the vector in the DPV at position <num>. This vector is referred to as the <dposns> vector. In step 654, the TPU gets the positions of elements of the <dposns> vector with indices of the positions of 1-bits in the <mask> vector. That is, if the <mask> vector has 1-bits at 5 and 11, the TPU gets the positions of the 5th and 11th 1-bits of <dposns>. In step 656, the TPU sets the 1-bits at these positions in the <ret_dposns> vector.

In step 658, the TPU performs a binary AND operation between the <DIDs> vector and the <found> vector, and keeps the results in the <DIDs> vector. Since <found> had a 1-bit set for each <DID> that contained the word/phrase, this step leaves these 1-bits set in the <DIDs> vector and no other 1-bits. Thus, the <DIDs> vector contains a 1-bit for each <DID> where the word/phrase was found. For each of these 1-bits, there is a vector in <Dposns> of the dposns of the word/phrase in that <DID>. For example, if the first 1-bit set in the <DIDs> vector is at position 5, the first vector in <Dposns> contains the dposns of all occurrences of the word/phrase in the document with DID 5.

To illustrate the execution of the search algorithm of FIGS. 18A-18F, a search for the word "example" in the exemplary text object of FIGS. 11-16 is provided. The search covers both DIDs 1 and 2. In order to initiate the search, the user provides a search command with the search word "example," and a <DIDs> vector that has the first and second bits set indicating that both DIDs 1 and 2 are to be searched. The optional document position return vector is <Dposns>.

The TPU initiates the search by performing a lookup of the word "example" in the dictionary. The lookup returns WID "4001" corresponding to the word "example." The index of WID "4001" in the WSV 300a is "7" because it is the 7th 1-bit in the WSV. The PID vector for this WID is therefore the 7th vector of the WUS 302a. The PID vector indicates that instances of the word "example" occur in PIDs 4, 8, and 13.

The TPU then steps through the 1-bits in the <DIDs> vector. The first 1-bit indicates DID 1. Accordingly, the document with DID 1 is searched for the word "example." The TPU finds the index of DID 1 in the DSV 216a, that is, index 1, and finds the document number from the DNV 218a at that index. The document number for DID 1 is also 1.

The TPU then finds the first PID of document number 1 from the PIV 212a. The first 1-bit of the PIV is at position 1, so the first PID is 1. The TPU also finds the last PID of document number 1. Because the next 1-bit of the PIV is at position 9, the last PID is one before position 9, that is, position 8.

The TPU then masks off the PIDs from the first PID, PID 1, to the last PID, PID 8, in the <mask> vector. The <mask> vector thus has 1-bits set at every position from 1 to 8, inclusive, and no other 1-bits.

The TPU then performs a binary AND operation with "example"'s PID vector and the <mask> vector, and obtains the PIDs of all instances of the search word "example" in DID 1, that is PIDs 4 and 8. The result is stored in the <mask> vector, and a 1-bit for DID 1 is set in the <found> vector. The index of the 1-bit for DID 1 in the <found> vector is 1. Thus, the TPU creates a <ret_dposns> vector in position 1 of the <Dposns> return vector.

The TPU next obtains the dposns vector corresponding to document number 1 from the DPV 214a. For each 1-bit in <mask>, that is, at positions 4 and 8, the TPU gets the dposns at these indices from the dposns vector, that is, dposns 12 and 30. At those positions, 1-bits are then set in the <ret_dposns> vector.

The TPU next searches the second document, document with DID 2, for the search word "example." The TPU finds the index of DID 2 in the DSV 216a, that is, index 2, and finds the document number from the DNV 218a at that index. The document number for DID 2 is also 2.

The TPU then finds the first PID of document number 2 from the PIV 212a. The second 1-bit of the PIV is at position 9, so the first PID is 9. The TPU also finds the last PID of document number 2. Because the next 1-bit of the PIV is at position 14, the last PID is one before position 14, that is, position 13.

The TPU then masks off the PIDs from the first PID, PID 9, to the last PID, PID 13, in the <mask> vector. The <mask> vector thus has 1-bits set at every position from 9 to 13, inclusive, and no other 1-bits.

The TPU then performs an AND operation with "example"'s PID vector <PIDresults> and the <mask> vector, and obtains the PIDs of all instances of the search word "example" in DID 2, that is PID 13. The result is stored in the <mask> vector.

The TPU then deletes the first eight (9-1) positions in <mask>. The new <mask> vector now has a 1-bit at position 5. The TPU then sets a 1-bit for DID 2 in the <found> vector. The index of the 1-bit for DID 2 in the <found> vector is 2. Thus, the TPU creates a <ret_dposns2> vector in position 2 of the <Dposns> return vector.

The TPU next obtains the dposns vector corresponding to document number 2 from the DPV 214a. For each 1-bit in <mask>, that is, at position 5, the TPU gets the dposns at this index from the dposns vector, that is, dposn 19. A 1-bit at that position is then set in the <ret_dposns2> vector.

The TPU then performs an AND operation with the <found> vector and the <DIDs> vector to get the result, and keeps the results in the <DIDs> vector. Here, because both documents contained an instance of the searched word, both the first and second bits of the <DIDs> vector for DIDs 1 and 2, are set with a 1-bit. Also, the <Dposns> vector contains two vectors containing the dposns of the instances of the word "example" in DIDs 1 and 2.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system for representing and searching a document including unstructured data, the system comprising:
   a data store storing a plurality of documents;
   a processor executing program instructions, the program instructions including generating a binary representation of the unstructured data in the plurality of documents and searching the binary representation in response to a search request, the processor generating an output based on the search; and
   a memory storing the binary representation of the unstructured data in a plurality of data structures, the data structures including:
      a first binary bit vector identifying a plurality of unstructured data included in the plurality of documents;
      a plurality of second binary bit vectors, wherein for each of the plurality of unstructured data identified in the first binary bit vector, a corresponding second binary bit vector sets one or more bits for one or more position identifiers assigned to one or more instances of the associated unstructured data appearing in one or more of the plurality of documents, wherein the instance of an unstructured data appearing at the end of a first one of the plurality of documents is assigned a position identifier of n, and the instance of an unstructured data appearing at the beginning of a second one of the plurality of documents is assigned a position identifier of n+1, wherein n is an integer greater than 0; and a positional ID vector indicating a start position identifier of each word appearing at the beginning of each of the plurality of documents, wherein the program instructions for searching the binary representation include:
  determining if a particular search term provided with the search request is identified in the first binary bit vector;
  if the particular search term is identified in the first binary bit vector, retrieving the corresponding second binary bit vector;
  identifying from the positional ID vector the start position identifier of the word at the beginning of a particular one of the plurality of documents to be searched;
  deducing from the positional ID vector an end position identifier of a word at the end of the particular one of the plurality of documents to be searched; and
  identifying one or more bits set for one or more of the position identifiers in the retrieved secondary binary bit vector between the start position identifier and the end position identifier for identifying all instances of the search term occurring in the particular document.

2. The system of claim 1, wherein the unstructured data is a word.

3. The system of claim 2 further comprising a dictionary of words, the dictionary providing a unique word identifier for each word in the dictionary, each position of the first binary bit vector being associated with a particular word identifier provided by the dictionary.

4. The system of claim 3, wherein the search term includes a search word, and the processor retrieves a word identifier for the search word.

5. The system of claim 1, wherein the program instructions further include:
  storing 1-bit values in a temporary vector from a start position identified by the start position identifier to an end position identified by the end position identifier; and
  performing a logical AND operation based on the temporary vector and the retrieved second binary bit vector for identifying all position identifiers for all instances of the search term occurring in the particular document.

6. The system of claim 1, wherein the search term is a phrase including a plurality of search words.

7. The system of claim 1, wherein the data structures further include:
  a fourth binary vector indicating a document position of each unstructured data in the document.

8. A computer-implemented method for representing and searching a document including unstructured data, the method comprising:
  generating, under control of the computer, a binary representation of the unstructured data in a plurality of documents;
  storing the binary representation of the unstructured data in a plurality of data structures, the data structures including:
  a first binary bit vector identifying a plurality of unstructured data stored in the plurality of documents;
  a plurality of second binary bit vectors, wherein for each of the plurality of unstructured data identified in the first binary bit vector, a corresponding second binary bit vector sets one or more bits for one or more position identifiers assigned to one or more instances of the associated unstructured data appearing in one or more of the plurality of documents, wherein the instance of an unstructured data appearing at the end of a first one of the plurality of documents is assigned a position identifier of n, and the instance of an unstructured data appearing at the beginning of a second one of the plurality of documents is assigned a position identifier of n+1, wherein n is an integer greater than 0; and
  a positional ID vector indicating a start position identifier of each word appearing at the beginning of each of the plurality of documents;
  receiving a search request including a search term;
  determining if a particular search term provided with the search request is identified in the first binary bit vector;
  if the particular search term is identified in the first binary bit vector, retrieving the corresponding second binary bit vector;
  identifying from the positional ID vector the start position identifier of the word at the beginning of a particular one of the plurality of documents to be searched;
  deducing from the positional ID vector an end position identifier of a word at the end of the particular one of the plurality of documents to be searched;
  identifying one or more bits set for one or more of the position identifiers in the retrieved secondary binary bit vector between the start position identifier and the end position identifier for identifying all instances of the search term occurring in the particular document; and
  generating, under control of the computer, an output based on the search.

9. The method of claim 8, wherein the unstructured data is a word.

10. The method of claim 9, wherein a dictionary of words provide a unique word identifier for each word in the dictionary, and each position of the first binary bit vector is associated with a particular word identifier provided by the dictionary.

11. The method of claim 10, wherein the search term includes a search word, and the processor retrieves a word identifier for the search word.

12. The method of claim 10 further comprising:
  storing 1-bit values in a temporary vector from a start position identified by the start position identifier to an end position identified by the end position identifier; and
  performing a logical AND operation based on the temporary vector and the retrieved second binary bit vector for identifying all position identifiers for all instances of the search term occurring in the particular document.

13. The method of claim 8, wherein the search term is a phrase including a plurality of search words.

14. The method of claim 8, wherein the data structures further include:
  a fourth binary vector indicating a document position of each unstructured data in the document.

15. A method for representing unstructured data included in a plurality of documents, the method comprising:
  parsing the plurality of documents;
  obtaining a unique word identifier for each unstructured data included in the plurality of documents;
  storing a first bit-value at each position of a first binary bit vector identified by each obtained unique word identifier;
  assigning a unique position identifier to each unstructured data included in the plurality of documents, wherein the unstructured data appearing at the end of a first one of the plurality of documents is assigned a position identifier of n, and the unstructured data appearing at the beginning of a second one of the plurality of documents is assigned a position identifier of n+1, wherein n is an integer greater than 0;

retrieving a second binary bit vector for each of the unique word identifiers for which the first bit-value is set in the first binary bit vector;

storing a second bit-value at each position of the retrieved second binary bit vector identified by one or more of the position identifiers assigned to one or more instances of the corresponding unstructured data identified by the unique word identifier; and setting a positional ID vector indicating a start position identifier of each word appearing at the beginning of each of the plurality of documents, and a word appearing at the beginning of a future document to the added to the plurality of documents.

16. The method of claim 15, wherein the unstructured data is a word.

17. A computer-implemented method for representing and searching a document including unstructured data, the method comprising:

providing access to a plurality of document collections, each document collection storing a plurality of documents;

representing the plurality of documents in a particular one of the document collections via a single text object, the single text object including a plurality of structures providing a binary representation of the plurality of the documents, the plurality of structures including:

an inverted index including a word select vector and a word use set for indexing a plurality of words appearing in the plurality of documents, the word select vector setting a bit for each of the plurality of words, and the word use set including a position vector for each of the words having a bit set in the word select vector, the position vector setting a bit for each position identifier assigned to each instance of the corresponding word appearing in one or more of the plurality of documents, wherein the instance of a word appearing at the end of a first one of the plurality of documents is assigned a position identifier of n, and the instance of a word appearing at the beginning of a second one of the plurality of documents is assigned a position identifier of n+1, wherein n is an integer greater than 0;

a positional ID vector indicating a start position identifier of each indexed word appearing at the beginning of each of the plurality of documents, and an indexed word appearing at the beginning of a future document to the added to the plurality of documents; and a document positions vector indicating, for each of the plurality of documents, an actual position in the corresponding document in which an instance of the indexed word occurs;

receiving a search term;

determining whether the bit corresponding to the search term is set in the word select vector;

if the bit corresponding to the search term is set in the word select vector, retrieving the corresponding position vector from the word use set;

selecting a first document to be searched from the plurality of documents in the particular document collection;

retrieving the start position identifier of the indexed word at the beginning of the first document to be searched from the positional ID vector;

deducing an end position identifier corresponding to an indexed word at the end of the first document to be searched from the positional ID vector;

setting bits in a mask vector from a start position identified by the start position identifier to an end position identified by the end position identifier;

performing a logical AND operation with the mask vector and the retrieved position vector for identifying all position identifiers for all instances of the search term occurring in the first document; and identifying actual locations of the identified instances of the search term in the first document from the document positions vector.

18. The method of claim 17, wherein the actual positions indicated in the document positions vector are character positions in the corresponding document.

19. The method of claim 17, wherein the position identifiers in the positional ID vector do not reflect the actual positions of the words in the corresponding documents.

20. The method of claim 19, wherein the second one of the plurality of documents appears sequentially in the document collection after the first one of the plurality of documents.

21. The method of claim 17, wherein the end position identifier corresponding to the word at the end of the first document is based on the start position identifier corresponding to the word at the beginning of a second document consecutively following the first document in the particular document collection.

22. The method of claim 17, wherein the start position identifier stored in the positional ID vector for the second one of the plurality of documents is n+1.

* * * * *